United States Patent
Mochrie et al.

(10) Patent No.: US 11,933,225 B2
(45) Date of Patent: Mar. 19, 2024

(54) FUEL MANAGEMENT SYSTEM

(71) Applicant: ROLLS-ROYCE plc, London (GB)

(72) Inventors: Richard G Mochrie, Guildford (GB); David A Jones, Bristol (GB); Gordon Illing, Bristol (GB)

(73) Assignee: ROLLS-ROYCE plc, London (GB)

( * ) Notice: Subject to any disclaimer, the term of this patent is extended or adjusted under 35 U.S.C. 154(b) by 0 days.

(21) Appl. No.: 18/166,285

(22) Filed: Feb. 8, 2023

(65) Prior Publication Data

US 2023/0279813 A1   Sep. 7, 2023

(30) Foreign Application Priority Data

Mar. 3, 2022 (GB) ...................................... 2202946

(51) Int. Cl.
*F02C 7/224* (2006.01)

(52) U.S. Cl.
CPC .......... *F02C 7/224* (2013.01); *F05D 2220/32* (2013.01); *F05D 2240/35* (2013.01); *F05D 2260/213* (2013.01); *F05D 2270/07* (2013.01)

(58) Field of Classification Search
CPC .......... F02C 7/224; F02C 7/228; F02C 7/236; F02K 3/10; F05D 2220/32; F05D 2240/35; F05D 2260/213; F05D 2270/07
See application file for complete search history.

(56) References Cited

U.S. PATENT DOCUMENTS

| | | | | |
|---|---|---|---|---|
| 3,486,458 A | * | 12/1969 | Tyler | F02C 7/236 431/89 |
| 3,779,007 A | * | 12/1973 | Lavash | F02C 7/14 60/39.83 |
| 5,116,362 A | | 5/1992 | Arline et al. | |
| 6,981,359 B2 | * | 1/2006 | Wernberg | F02C 7/232 60/734 |

(Continued)

FOREIGN PATENT DOCUMENTS

| | | |
|---|---|---|
| FR | 2992306 A1 | 12/2013 |
| GB | 1194041 A | 6/1970 |
| GB | 2 289 722 A | 11/1995 |

OTHER PUBLICATIONS

Jul. 10, 2023 extended Search Report issued in European Patent Application No. 23155255.5.

(Continued)

*Primary Examiner* — Jesse S Bogue
(74) *Attorney, Agent, or Firm* — Oliff PLC

(57) ABSTRACT

A fuel management system includes: a fuel tank; a fuel supply line that supply fuel from the fuel tank to a combustor of the gas turbine engine; a reheat fuel supply line that supply fuel from fuel tank to a reheat of the gas turbine engine, the reheat fuel supply line extending from a reheat branching point on the fuel supply line to the reheat; a fuel supply pump disposed along fuel supply line upstream of the reheat branching point; a reheat pump disposed along reheat fuel supply line, the reheat pump that pressurise fuel to a reheat delivery pressure for delivery to the reheat; and a (Continued)

reheat recirculation line that recirculate fuel from the reheat fuel supply line to a location upstream of fuel supply pump, the reheat recirculation line extending from a reheat recirculation branching point on the reheat fuel supply line downstream of the reheat pump.

14 Claims, 4 Drawing Sheets

(56) References Cited

U.S. PATENT DOCUMENTS

| | | | |
|---|---|---|---|
| 7,185,485 B2* | 3/2007 | Lewis | F02C 9/263 60/764 |
| 8,925,322 B2* | 1/2015 | Scully | F02C 9/263 60/734 |
| 10,752,374 B1 | 8/2020 | Lui et al. | |
| 11,560,239 B2* | 1/2023 | Rambo | B64D 37/34 |
| 2003/0074884 A1* | 4/2003 | Snow | F02C 9/48 60/764 |
| 2012/0297780 A1 | 11/2012 | Bruno et al. | |
| 2012/0312037 A1* | 12/2012 | Finney | B64D 37/34 62/115 |
| 2016/0230669 A1 | 8/2016 | Selstad et al. | |
| 2016/0281656 A1 | 9/2016 | Alecu et al. | |
| 2019/0277201 A1 | 9/2019 | Veilleux, Jr. et al. | |
| 2021/0229827 A1 | 7/2021 | Doman | |

OTHER PUBLICATIONS

Jul. 10, 2023 extended Search Report issued in European Patent Application No. 23155253.0.
Jul. 10, 2023 extended Search Report issued in European Patent Application No. 23155251.4.
Jul. 10, 2023 extended Search Report issued in European Patent Application No. 23155250.6.
Sep. 30, 2022 Search Report issued in United Kingdom Patent Application No. GB2206111.3.
Aug. 22, 2022 Search Report issued in United Kingdom Patent Application No. GB2202948.2.
Aug. 22, 2022 Search Report issued in United Kingdom Application No. GB2202947.4.
Jul. 28, 2022 Search Report issued in United Kingdom Patent Application No. GB2202946.6.
U.S. Appl. No. 18/166,308, filed Feb. 8, 2023 on behalf of Richard G Mochrie.
U.S. Appl. No. 18/166,253, filed Feb. 8, 2023 on behalf of Richard G Mochrie.
U.S. Appl. No. 18/166,268, filed Feb. 8, 2023 on behalf of Richard G Mochrie.
Sep. 14, 2023 Office Action issued U.S. Appl. No. 18/166,268.

* cited by examiner

FUEL MANAGEMENT SYSTEM

This disclosure claims the benefit of UK Patent Application No. GB 2202946.6, filed on 3 Mar. 2022, which is hereby incorporated herein in its entirety.

TECHNICAL FIELD

The present disclosure relates to a fuel management system for a gas turbine engine. It relates further to a gas turbine comprising a fuel management system.

BACKGROUND

Fuel management systems are conventionally used for providing fuel to a gas turbine engine and for management of thermal loads. Some gas turbine engines comprise a combustor and a reheat, also known as an afterburner, to provide different levels of engine thrust. Known fuel management systems for gas turbine engines comprising a reheat can be complex and inefficient. It is therefore desirable to provide an improved fuel management system for a gas turbine engine comprising a reheat.

SUMMARY

According to a first aspect of the present disclosure, there is provided a fuel management system for a gas turbine engine. The fuel management system comprises: a fuel tank configured to store fuel for the gas turbine engine; a fuel supply line configured to supply fuel from the fuel tank to a combustor of the gas turbine engine; a reheat fuel supply line configured to supply fuel from the fuel tank to a reheat of the gas turbine engine, the reheat fuel supply line extending from a reheat branching point on the fuel supply line to the reheat; a fuel supply pump disposed along the fuel supply line upstream of the reheat branching point; a reheat pump disposed along the reheat fuel supply line, the reheat pump configured to pressurise fuel to a reheat delivery pressure for delivery to the reheat; and a reheat recirculation line configured to recirculate fuel from the reheat fuel supply line to a location upstream of the fuel supply pump, the reheat recirculation line extending from a reheat recirculation branching point on the reheat fuel supply line downstream of the reheat pump.

Reheat should be understood as synonymous with "afterburner".

The term fuel tank should be understood as a bulk fuel storage system for the gas turbine engine. The fuel tank may be an airframe fuel tank. The fuel tank may be an engine-located fuel tank or fuel sump.

The reheat recirculation line may be configured to recirculate fuel to the fuel tank. The reheat circulation line may be configured to recirculate fuel to the fuel supply line upstream of the fuel supply pump.

The fuel management system may further comprise a reheat recirculation control system configured to control the recirculation of fuel from the reheat fuel supply line via the reheat recirculation line.

The reheat recirculation control system may be configured to meter fuel flow to the reheat by selectively recirculating fuel from the reheat fuel supply line via the reheat recirculation line.

The reheat recirculation control system may be configured to: determine a reheat pump supply rate from the reheat pump; determine a reheat fuel demand rate required by the reheat; determine a required recirculation rate based upon the reheat pump supply rate and the reheat fuel demand rate; and recirculate fuel at the required recirculation rate via the reheat recirculation line to provide fuel to the reheat at the reheat fuel demand rate.

The reheat recirculation control system may further comprise a reheat controller configured to receive a reheat control signal and to determine the reheat fuel demand based on the reheat control signal.

"Determining" the fuel supply and demand rates may include measuring the rates using sensors, determining the rates by calculation or otherwise, and/or receiving inputs or values representing the rates from other systems, such as the main control systems of the aircraft or gas turbine engine.

For example, the reheat pump supply rate may be measured using a flow rate sensor downstream of the reheat pump, and the reheat fuel rate may be determined by receiving a reheat control signal from the aircraft control systems which might indicate or be determined to indicate the demand rate. For example, if a "no reheat" control signal is received by the reheat circulation control system, then this may be determined to require a reheat fuel demand rate of substantially zero. Therefore, the required recirculation rate may be determined to substantially all of, or equal to, the fuel supply rate. If a "full reheat" control signal is received by the reheat circulation control system, then this may be determined to require a maximum reheat fuel demand rate. Therefore, the required recirculation rate may be determined to substantially zero. Other intermediate recirculation rates can be envisaged, for example if an intermediate amount of reheat is required.

The reheat control signal may be a human-activated control signal, or an automatically generated control signal from an autopilot, an automated control system, or the like.

The reheat recirculation line may comprise a non-return valve for preventing backflow along the reheat recirculation line. The reheat recirculation line may comprise an orifice plate, fixed or adjustable, for maintaining a minimum predetermined pressure in the reheat recirculation line.

The reheat recirculation line may further comprise a recirculation heat exchanger. The reheat recirculation line may comprise a first recirculation branch line and a second recirculation branch line. In some examples, one of the recirculation branch lines may comprise the recirculation heat exchanger.

The first and second recirculation branch lines may be configured to combine upstream of the non-return valve and/or orifice plate. The first and second recirculation branch lines may be configured to begin at a branching point in the reheat recirculation line or may be configured as two separate recirculation lines each having its own reheat recirculation branching point on the reheat fuel supply line.

The recirculation heat exchanger may be configured to reject excess heat from fuel in the first recirculation line. The recirculation heat exchanger may reject heat from the fuel in the recirculation line to ram air, to fuel in the fuel supply line, or any other heat sink in the thermal management system of the gas turbine engine or aircraft.

The fuel management system may further comprise a heat exchanger disposed along the reheat fuel supply line and/or along the fuel supply line upstream of the reheat branching point.

The heat exchanger may be configured to reject excess heat into fuel in the reheat fuel supply line or the fuel supply line. The recirculation heat exchanger may receive rejected heat from the fuel in the recirculation line, from fuel in elsewhere in the fuel supply line, or from any other heat source in the thermal management system of the gas turbine engine or aircraft, such as from an oil thermal management line.

The fuel management system may further comprise a combustor pump disposed along the fuel supply line downstream of the reheat branching point and upstream of the combustor, configured to pressurise fuel to a combustor delivery pressure for the combustor or to provide a demanded combustor fuel delivery rate; and a combustor heat exchanger located on the fuel supply line downstream of the reheat branching point and upstream of the combustor configured to exchange heat into fuel in the fuel supply line between the reheat branching point and the combustor.

The combustor heat exchanger may be arranged downstream or upstream of the combustor pump.

A metering unit may be provided downstream of the combustor pump and upstream of the combustor, configured to meter fuel to the combustor. The metering unit may comprise a combustor recirculation line configured to recirculate fuel downstream of the combustor pump to upstream of the combustor pump.

The fuel management system may further comprise a reheat pump controller configured to control the speed, pressure, and/or flow rate of the reheat pump. The reheat pump controller may be configured to control the reheat pump independent of an auxiliary gearbox shaft speed.

The reheat pump controller may be configured to operate the reheat pump so as to substantially maximise an efficiency of the reheat pump.

The reheat pump has one or more efficiency curve, and it is desirable to operate the pump at, or close to, its maximum efficiency. However, the maximum or high efficiency settings for the reheat pump may not suit the required fuel flow rate for the reheat at any given time. Therefore, the reheat recirculation line may permit the reheat pump to be operated at maximum efficiency, even if this outputs too much fuel, as the excess fuel can simply be recirculated without being delivered to the reheat.

The fuel management system may further comprise a flow control valve disposed in the reheat fuel supply line downstream of the reheat pump and upstream of the reheat recirculation branching point.

According to a second aspect of the present disclosure, there is provided a gas turbine engine comprising a fuel management system according to the first aspect above.

According to a third aspect of the present disclosure, there is provided a method of managing fuel in a gas turbine engine comprising: supplying fuel from a fuel tank to a combustor of the gas turbine engine via a fuel supply line comprising a first fuel supply pump; branching fuel from the fuel supply line into a reheat fuel supply line for supplying fuel to a reheat of the gas turbine engine at a reheat branching point, the reheat branching point being downstream of the first fuel supply pump; pressurising the fuel in the reheat fuel supply line to a reheat delivery pressure using a reheat pump disposed along the reheat fuel supply; recirculating fuel from the reheat fuel supply line via a reheat recirculation line to a location upstream of the first fuel supply pump, the reheat recirculation line extending from a reheat recirculation branching point on the reheat fuel supply line downstream of the reheat pump.

A portion of the fuel management system upstream of the fuel supply pump may be a low pressure portion of the system. A portion of the fuel management system downstream of the fuel supply pump and upstream of the combustor pump and the reheat pump may be a medium pressure portion of the system. A portion of the fuel management system downstream of the combustor pump and downstream of the reheat pump may be a high pressure portion of the system. The reheat recirculation line may extend from the high pressure portion, and in particular the high pressure portion of the reheat fuel supply line, to the low pressure portion of the system.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

The gearbox may be a reduction gearbox (in that the output to the fan is a lower rotational rate than the input from the core shaft). Any type of gearbox may be used. For example, the gearbox may be a "planetary" or "star" gearbox, as described in more detail elsewhere herein.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

According to an aspect, there is provided an aircraft comprising a cabin blower system or a gas turbine engine as described and/or claimed herein.

The skilled person will appreciate that except where mutually exclusive, a feature described in relation to any one of the above aspects may be applied mutatis mutandis to any other aspect. Furthermore, except where mutually exclusive any feature described herein may be applied to any aspect and/or combined with any other feature described herein.

BRIEF DESCRIPTION OF THE DRAWINGS

Embodiments will now be described by way of example only with reference to the accompanying drawings, which are purely schematic and not to scale, and in which.

DETAILED DESCRIPTION

Figure 1:
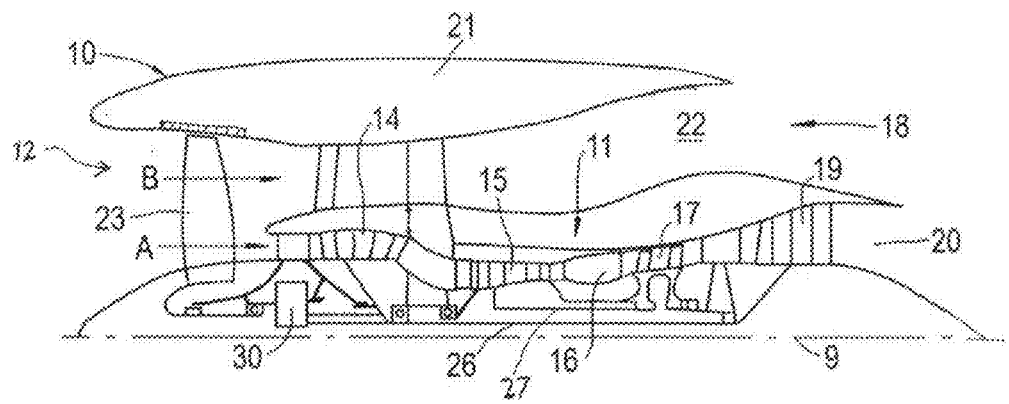
FIG. 1 shows a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustor 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustor 16 where it is mixed with fuel and the mixture is combusted. The resultant hot combustion products then expand through, and thereby drive, the high pressure and low pressure turbines 17, 19 before being exhausted through the nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 2:
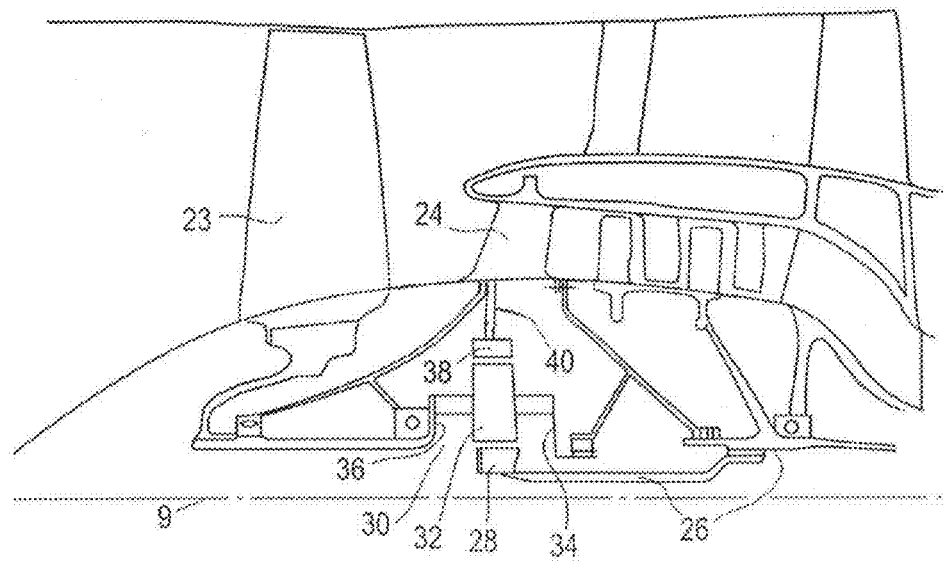
FIG. 2 shows a close up sectional side view of an upstream portion of a gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
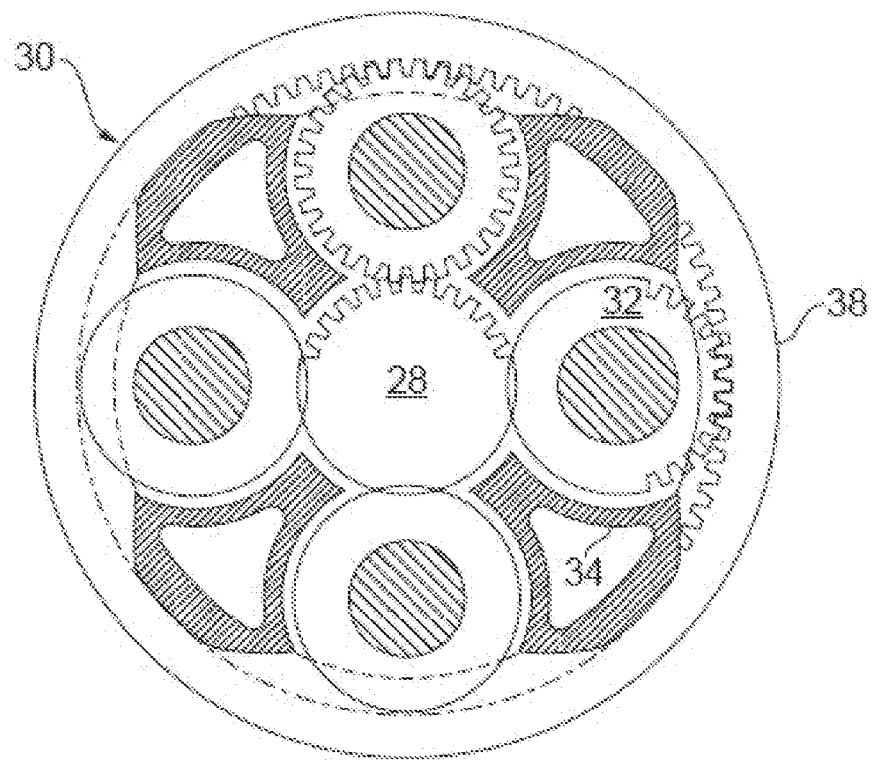
FIG. 3 shows a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 18, 20 meaning that the flow through the bypass duct 22 has its own nozzle 18 that is separate to and radially outside the core engine nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

Figure 4A:
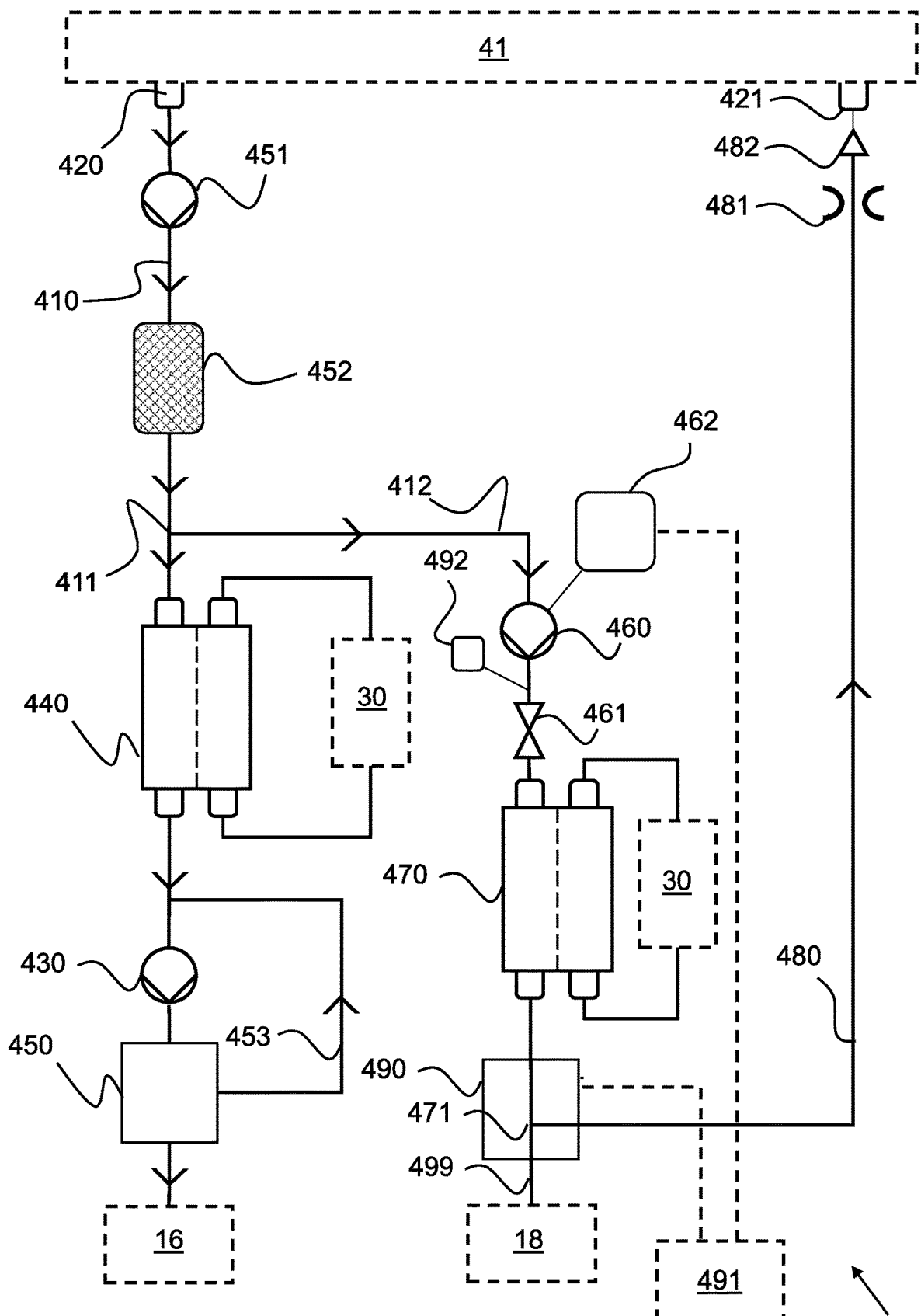
FIG. 4A shows a schematic view of a first example fuel management system according to the present disclosure.

FIG. 4A shows a schematic view of a first example fuel management system 400A for a gas turbine engine according to the present disclosure. The fuel management system 400A comprises a fuel supply line 410 configured to supply fuel from a fuel tank 41 to a combustor 16 of the gas turbine engine. An inlet 420 is configured to receive fuel from the fuel tank 41 of the gas turbine engine and/or a fuel tank 41 of an aircraft. A boost pump may be provided at or near the inlet of the fuel supply line 410 from the fuel tank 41 in order to pressurise the fuel to a suitable pressure for entering the fuel supply line. The fuel management system 400A further comprises a combustor pump 430 located upstream of a combustor metering unit 450 along the fuel supply line 410. The combustor pump 430 is configured to increase a pressure of fuel within the fuel supply line 410 and thereby pressurise fuel to a delivery pressure for the combustor 16.

The fuel management system 400A comprises a combustor heat exchanger 440 located on the fuel supply line 410 upstream of the combustor pump 430. The combustor heat exchanger 440 is configured to exchange heat from a heat source of the gas turbine engine (such as an oil cooling system, or other heat source) to fuel in the fuel supply line 410. In this example, the combustor heat exchanger 440 is configured to receive a thermal load from the gearbox 30. In other examples, the combustor heat exchanger may be located downstream of the combustor pump. Accordingly, the fuel supply line 410 is configured to supply fuel from the fuel tank 41 to the combustor 16 via the combustor metering unit 450 such that fuel passing through the combustor metering unit 450 has been subject to pressurisation to the delivery pressure by the combustor pump 430 and has also passed through the combustor heat exchanger 440. The combustor metering unit 450 is configured to meter fuel from the fuel supply line 410 to the combustor 16. A combustor recirculation line 453 is configured to recirculate fuel from the combustor metering unit 450 upstream on the fuel supply line 410 to upstream of the combustor pump 430 to provide a metered output flow from the combustor metering unit 450 to the combustor 16.

The fuel supply line 410 comprises a fuel supply pump 451 located upstream of the combustor pump 430. The fuel supply pump may be a boost pump or may be provided in addition to a boost pump. The fuel supply pump 451 is generally configured to receive fuel at a first pressure, in particular the storage pressure in the fuel tank 41 (or the output pressure provided by the boost pump, if present) and pressurise the fuel to a second pressure for supply downstream along the fuel supply line 410. The portion of the fuel management system 400A upstream of the fuel supply pump 451 may be a low pressure portion of the system, the portion of the fuel management system 400A downstream of the fuel supply pump 451 and the combustor pump 430 may be a medium pressure portion of the system, and the portion of the fuel management system downstream of the combustor pump 430 may be a high pressure portion of the system. A filter 452 is disposed in the fuel supply line 410 for filtering fuel.

The fuel management system 400A further comprises a reheat fuel supply line 412 which is configured to supply fuel from the fuel tank 41 to a reheat 18 (i.e., afterburner) of the gas turbine engine 10 from the fuel supply line 410. In the example of FIG. 4A, the reheat fuel supply line 412 extends from a reheat branching point 411 on fuel supply line 410 to the reheat 18. The reheat fuel supply line 412 comprises a reheat pump 460. The reheat pump 460 is configured to increase a pressure of fuel within the reheat fuel supply line 410 and thereby pressurise fuel to a delivery pressure for the reheat 18. The reheat pump 460 is powered by an independent pump controller 462 such that the pump 460 is fully- and independently-controllable, i.e., it can operate independently of the auxiliary gearbox shaft speed. In other examples, the reheat pump 460 may be driven by an engine gearbox rather than an independent controller, and such a configuration may also provide many of the benefits contemplated in this disclosure.

The reheat fuel supply line 412 further comprises a valve 461 downstream of the reheat pump 460, for closing the reheat fuel supply line 412 if required.

Figure 4B:
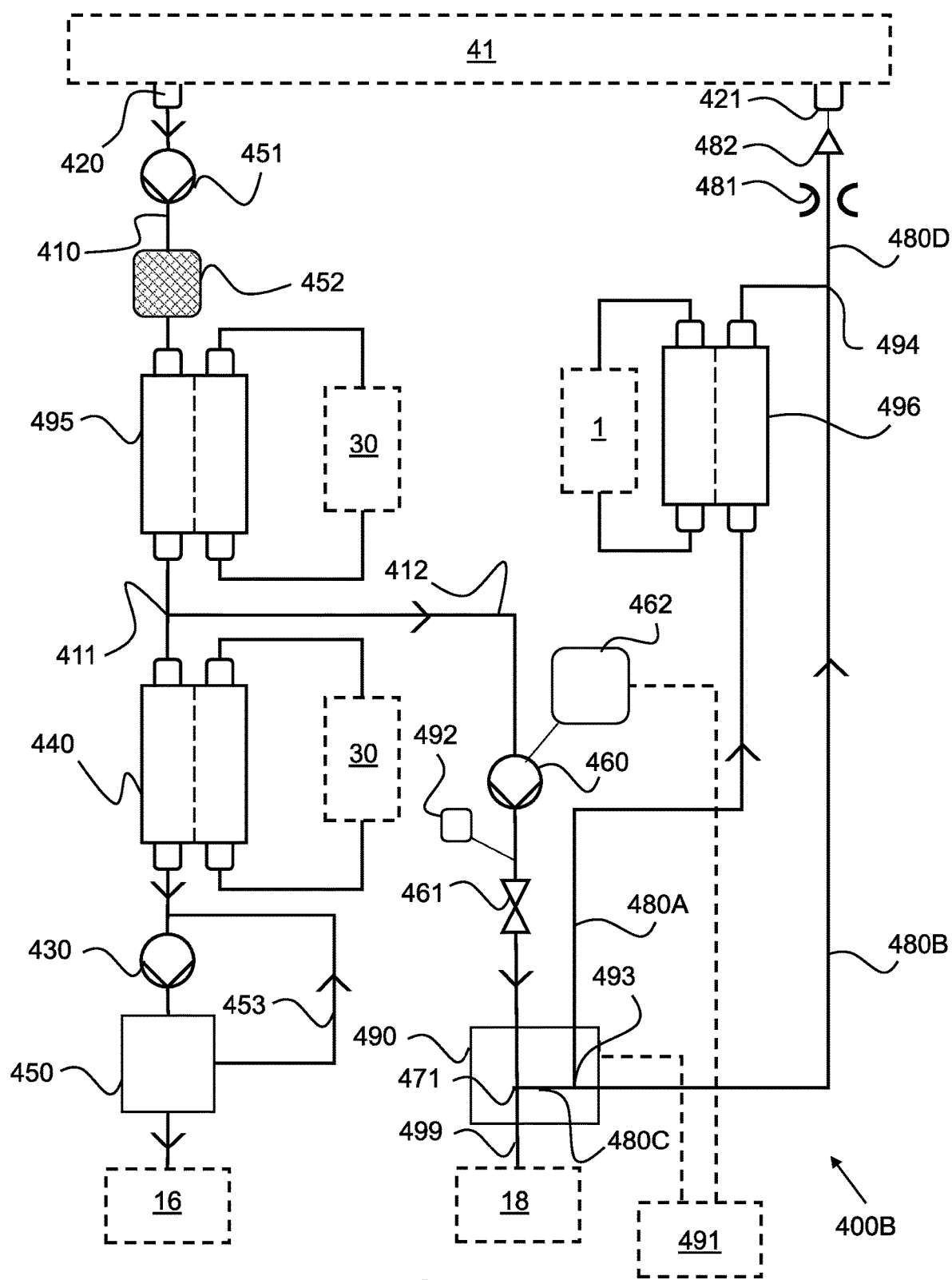
FIG. 4B shows a schematic view of a second example fuel management system according to the present disclosure.

The fuel management system 400A comprises a reheat heat exchanger 470 located on the reheat fuel supply line 412 downstream of the reheat pump 460. The reheat heat exchanger 470 is configured to exchange heat from a heat source of the gas turbine engine (such as an oil cooling system, or other heat source) to fuel in the reheat fuel supply line 412. In this example, the reheat heat exchanger 470 is configured to receive a thermal load from the gearbox 30. In other examples, the reheat heat exchanger 470 may not be provided, or may be provided in another location on the reheat line 412 or upstream thereof, such as shown in FIG. 4B of this disclosure.

The fuel management system 400A further comprises a reheat recirculation line 480 configured to recirculate an excess portion of fuel from the reheat fuel supply line 412 to a location upstream for resupply to the fuel supply line 410. The reheat recirculation line 480 extends from a reheat recirculation branching point 471 on the reheat fuel supply line 412, which is located downstream of the reheat pump 460. In this example, the reheat recirculation branching point 471 is also downstream of the reheat heat exchanger 470.

In the example of FIG. 4A, the reheat recirculation branching point 471 is located within a reheat recirculation control system 490. The reheat recirculation control system 490 is configured to control the recirculation of fuel from the reheat fuel supply line 412 via the reheat recirculation line 480. By controlling the recirculation of fuel from the reheat fuel supply line 412, the reheat recirculation control system 490 is configured to meter fuel flow to the reheat 18 by selectively recirculating a portion of fuel from the reheat fuel supply line 412 via the reheat recirculation line 480.

The portion of the reheat fuel supply line 412 downstream of the reheat recirculation branching point 471 may be referred to as the reheat delivery line 499. Any fuel entering the reheat delivery line 499 will be delivered to the reheat 18.

In this example, the reheat recirculation line 480 extends from the reheat recirculation branching point 471 to the fuel tank 41, such that fuel in the recirculation line 480 is delivered back to the fuel tank 41. In other examples, the reheat recirculation line may extend to a location on the fuel supply line which is upstream of the fuel supply pump 451. In other words, the reheat recirculation line may recirculate fuel from a high pressure portion of the reheat fuel supply line downstream of the reheat pump 460 to a low pressure portion of the system upstream of the fuel supply pump 451.

The fuel supply pump 451 and the filter 452 are both located upstream of the reheat branching point 411 such that fuel travelling in both the downstream portion of the fuel supply line 410 and in the reheat fuel supply line 412 are filtered and pressurised before reaching the combustor pump 430 or reheat pump 460 respectively.

The reheat recirculation line 480 also comprises pressure reducing element 481, such as a pressure reducing valve or orifice plate, a non-return valve 482 and a fuel outlet 421 from upstream to downstream. The pressure reducing element 481 may be configured to maintain a minimum upstream pressure in the reheat recirculation line 480 and may assist in avoiding sudden expansion of fuel when entering the fuel tank 41. This may ensure that there is a sufficient pressure in the reheat recirculation control system 490 when fuel is recirculating along the recirculation line 480. The non-return valve 482 is provided to mitigate the risk of reverse flow into system from the reheat recirculation line 480. The fuel outlet 421 is configured to release fuel into the fuel tank 41 from the reheat recirculation line 480. In other examples, the fuel outlet of the reheat recirculation line 480 may be configured to release fuel into the fuel supply line 410 upstream of the fuel supply pump 451.

In view of the above, the operation of the fuel management system 400A will now be described in both reheat and non-reheat modes.

When reheat is desired, a reheat signal may be provided by a reheat control system 491. The reheat signal may be derived from or related to a quantity of thrust demanded from gas turbine engine by, for example, an electronic fly-by-wire control system. The quantity of thrust demanded (i.e., the thrust demand) may vary continuously and/or discretely while the fuel management system 400A is in use, and so the fuel demand of the reheat 18 may vary continuously and/or discretely while the fuel management system 400A is in use.

The reheat control system 491 may indicate, include, or define a reheat fuel demand rate R which is required to be delivered to the reheat 18 in order to achieve the desired thrust from the engine.

The reheat control system 491 is configured to communicate with the reheat pump controller 462 and the reheat recirculation control system 490 to provide the required reheat fuel demand rate to the reheat 18 via the reheat delivery line 499.

To achieve this, the fuel management system 400A further comprises a reheat pump flow sensor 492 configured to monitor a reheat pump supply rate of the fuel which is expelled from the reheat pump 460. The reheat pump flow sensor 492 is therefore configured to monitor the flow rate upstream of the reheat recirculation branching point 471. In other examples, the reheat pump supply rate may be inferred or otherwise calculated using other methods, such as using pressure-based throttle valves The reheat recirculation control system 490 is configured to determine the reheat pump supply rate from the reheat pump 460 using the reheat pump flow sensor 492 and determine a reheat fuel demand rate required by the reheat 18 based upon the reheat signal. Based upon the reheat pump supply rate and the reheat fuel demand rate, the reheat recirculation control system 490 will determine a required recirculation rate of fuel to be recirculated by via the reheat recirculation line 480 in order to provide the reheat fuel demand rate to the reheat delivery line 499. For example, if the reheat fuel demand rate is lower than the reheat pump supply rate, then the reheat recirculation control system 490 will determine a required recirculation rate of fuel which must be recirculated via the reheat recirculation line such that fuel is supplied to the reheat delivery line 499 at the reheat fuel demand rate indicated by the reheat control system 491. In some examples, the reheat control system 491 may additionally adjust the operation of the reheat pump 460 using the reheat pump controller 462 to adjust the reheat pump supply rate in addition to recirculating fuel to meet the reheat fuel demand rate.

If the reheat signal from the reheat control system 491 is adjusted such that the reheat fuel demand rate changes, the reheat recirculation control system 490 may adjust the recirculation rate accordingly. If more fuel is required by the reheat 18, then the reheat recirculation control system 490 may recirculate less fuel so that more fuel is delivered to the reheat delivery line 499, or if less fuel is required by the reheat 18, then the reheat recirculation control system 490 may recirculate more fuel, such that less fuel is delivered to the reheat delivery line 499. Again, the reheat control system 491 may additionally adjust the reheat pump controller 462 to adjust the reheat pump's supply rate to better suit the reheat fuel demand rate. This may be appropriate if, for example, the required recirculation rate was greater than a maximum possible recirculation rate for the reheat recirculation line 480. It will be understood that the reheat recirculation line 480 permits fuel to be recirculated to account for any discrepancy between the required fuel rate for the reheat 18 and the fuel supply rate from the reheat pump 460.

Turning now to a non-reheat mode, in which no or minimal reheat is required, the function of the fuel management system 400A will be further described.

In previously known reheat systems, when no reheat was required, a valve downstream of the reheat pump would simply be closed such that the reheat pump would continue to run 'dry' (i.e., the pump remains running without expelling fuel—fuel may or may not be retained in the pump chamber during 'dry' running). This is undesirable for many reasons. For example, dry running a pump is typically inefficient and also causes excessive heating of the pump and fuel in the reheat line, which in turn can cause fuel coking, reduce service life, and increase maintenance costs and failure rates. Further, the operation of the valve to turn the reheat supply on or off could also cause high hammer shock pressures that can damage the fuel system.

When reheat is inactive, all fuel flow in the reheat fuel supply line 412 may recirculated via the recirculation line 480 and no fuel may be delivered to the reheat burners via the reheat delivery line 499.

In some examples, the reheat delivery line 499 may comprise a shut-off valve (not shown, but similar to valve 461) so that the reheat 18 can be physically isolated from the reheat fuel supply line 412 when reheat is inactive. In this reheat-off mode, the pump controller 462 may control the reheat pump to provide a relatively low outlet pressure, and a flow rate based on the cooling requirements of the reheat heat exchanger 470. This may minimise the pump power demand and the wasted heat generated but keep the fuel flowing for thermal management purposes.

In some examples, the reheat recirculation flow rate in reheat recirculation line 480 may be set based on, or based in part on, satisfying the requirements of a thermal management system of the engine.

Returning now to the exemplary fuel management system of FIG. 4A, the provision of a reheat recirculation line 480 in accordance with the present disclosure can mitigate some or all of these issues, as follows.

When reheat is not desired, the reheat signal of the reheat control system 491 may indicate, include, or define a reheat fuel demand rate R of substantially zero. In other words, when no reheat is required, then no fuel should be delivered to the reheat 18 via the reheat delivery line 499.

Based upon the reheat pump supply rate and the reheat fuel demand rate of zero, the reheat recirculation control system 490 will determine a required recirculation rate of fuel for all of the fuel expelled by the reheat pump 460 to be recirculated by via the reheat recirculation line 480, such that no fuel is provided to the reheat delivery line 499.

In some examples, the reheat control system 491 may additionally adjust the reheat pump controller 462 to adjust the reheat pump's supply rate to better suit the reheat fuel demand rate. In other examples, the reheat control system 491 may receive a signal indicating that more cooling capacity is required in the engine and may increase the reheat pump supply rate to increase the flow of fuel through the reheat heat exchanger 470 independently of the fuel requirements at the reheat. In the previously contemplated systems in which the pump was run 'dry' no such additional cooling capacity was achievable while the reheat was switched off.

A further benefit of the reheat recirculation line 480 is that the reheat pump 460 can be controlled to operate at high or maximum efficiency regardless of the reheat requirements of the engine. In previously considered systems, running the pump dry could be highly inefficient but the presently considered arrangement permits the pump to remain in operation flowing fuel even when fuel is not required at the reheat 18. Accordingly, the pump efficiency and, therefore, the overall engine efficiency may be improved by recirculation of fuel from the reheat fuel supply line.

Additionally, as the reheat pump 460 is operating and flowing fuel downstream even when reheat is not required, the system latency for providing reheat on demand may be reduced compared to other systems. Once the reheat signal indicates that reheat is required, the reheat recirculation control system 490 can quickly divert the already flowing fuel to the reheat delivery line 499 (or rather stop recirculating fuel via the recirculation line 480) in order to provide near-instant response time for reheat.

FIG. 4B shows a schematic view of a second example fuel management system 400B for a gas turbine engine according to the present disclosure. The second example fuel management system 400B is generally similar to the first example fuel management system 400A, with like reference numerals indicating common or similar features. In contrast to the first example fuel management system 400A, the second fuel management system 400B comprises an alternative heat exchanger arrangement and an alternative reheat recirculation line arrangement, as follows.

In fuel management system 400B, a heat exchanger is not provided on the reheat fuel supply line 412 itself and instead an additional upstream heat exchanger 495 is provided on the fuel supply line 410 upstream of the reheat branching point 411. The heat exchanger 495 is configured to exchange heat from a heat source of the gas turbine engine (such as an oil cooling system, electrical cooling system, or other heat source) to fuel in the fuel supply line 410. In this example, the combustor heat exchanger 495 is configured to receive a thermal load from the gearbox 30. The heat exchanger 495 therefore transfers a thermal load into fuel in the upstream portion of the fuel supply line 410 from another location.

Providing the additional heat exchanger downstream of the reheat pump as per fuel management system 400A is less thermally efficient than providing it upstream of the reheat branching point per fuel management system 400B because it will receive less fuel flow; however, the former configuration has the additional advantages of lower temperatures and higher pressures at the reheat pump's inlet. Accordingly, the location of the additional heat exchanger can be selected according to the particular system requirements and priorities.

In some examples, the additional heat exchanger in the reheat line/in system 400A and upstream of the reheat branching point 411 in system 400B may not interface directly with the oil system and may instead exchange heat with an intermediate thermal management loop, which incorporates multiple heat sinks (i.e., fuel and air). Such a configuration may mitigate against overcooling of the reheat fuel flow during particularly cold operational temperatures and, consequently, overcooling the oil system.

Another difference between the two exemplary fuel management systems 400A and 400B is the configuration of the reheat recirculation line 480.

In the fuel management system 400B, the reheat recirculation line 480 further comprises a first recirculation branch line 480A and a second recirculation branch line 480B. The reheat recirculation line 480 branches from the reheat fuel supply line 412 at the reheat recirculation branching point 471 and extends some distance downstream as an upstream recirculation line portion, denoted as 480C. The upstream recirculation line portion 480C itself then branches into the first recirculation branch line 480A and the second recirculation branch line 480B at a branching point 493. Fuel travelling along the upstream recirculation line portion 480C can therefore be directed via either of the recirculation branch lines 480A, 480B at the branching point 493. The proportion of fuel directed along each of the recirculation branch lines 480A, 480B is controlled by the reheat recirculation control system 490. In this example, the recirculation branch lines 480A, 480 extend downstream to a convergence point 494, at which the recirculation branch lines 480A, 480B recombine and continue downstream as a downstream recirculation line portion 480D once again. The pressure reducing element 481 and the non-return valve 482 are provided on the downstream recirculation line portion 480D, and the downstream recirculation line portion 480D extends into a single fuel outlet 421 to supply recirculated fuel back into the fuel tank 41. In other examples, each of the recirculation branch lines 480A, 480B may extend directly back to the fuel tank 41 at its own fuel outlet and may comprise its own pressure reducing element and/or non-return valve. In some other examples, the reheat recirculation line may comprise more than two recirculation branch lines.

In this example, the first recirculation branch line 480A comprises a recirculation heat exchanger 496. The recirculation heat exchanger 496 is configured to exchange heat from the fuel in the line 480A to a heat sink of the gas turbine engine (such as a ram air heat exchanger 1, or a refrigeration system). Depending on the fuel temperature and the thermal management system capacity, the recirculated fuel flow may be transported back to the fuel tank 41 via the first recirculation branch line 480A (and therefore via the recirculation heat exchanger 496 to cool the fuel) or via the second recirculation branch line 480B without cooling. Further, in some examples, such as where precise fuel temperature control is required, the fuel flow in the upstream recirculation line portion 480C may be bifurcated so that a proportion of the fuel flow passes via each of the recirculation branch lines 480A, 480B, and so that the re-combined fuel flow in the downstream recirculation line portion 480D entering the fuel tank 41 at a carefully controlled temperature.

Generally, when the thermal management system requires substantial additional thermal capacity in the fuel, the fuel will be recirculated along the first recirculation branch line 480A. For example, when a fuel tank temperature limit has been reached or exceeded, the fuel would be preferentially recirculated via the first recirculation branch line 480A and the recirculation heat exchanger 496 to bring down the bulk fuel temperature in the fuel tank 41. The configuration of fuel management system 400B is particularly advantageous because allowing fuel to recirculate via the reheat fuel supply line 412 and the recirculation branch lines 480A, 480B, additional cooling capacity can be provided even when the reheat is not in use.

Control of the fuel flow along the recirculation branch lines 480A, 480B is controlled by the reheat recirculation control system 490. The reheat recirculation control system 490 may be configured to receive instructions from a thermal management control system (not shown) to divert fuel along one or both recirculation branch lines 480A, 480B in accordance with the requirements of the thermal management control system. It should be understood that various controllable valves may be provided in the reheat recirculation line 480 for control by reheat recirculation control system 490 in order to direct the fuel flow as required.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein. The scope of protection is defined in the appended claims.

It should be understood that features of the fuel management systems 400A and 400B of FIGS. 3 and 4 may be combined within the principles of this disclosure, except where mutually exclusive.

For example, the reheat recirculation line 480 of system 400A could further comprise a recirculation heat exchanger 496 without also requiring the recirculation line to be branched in accordance with system 400B. If a recirculation heat exchanger 496 was provided in the reheat recirculation line 480 of system 400A, then a controlled bypass line could be provided for fuel to bypass the heat exchanger 496 if required. Further, a reheat heat exchanger 470 downstream of the reheat pump 460 could be provided in accordance with the system 400B rather than, or in addition to, providing a heat exchanger upstream of the reheat branching point.

What is claimed is:

1. A fuel management system for a gas turbine engine, the fuel management system comprising:
   a fuel tank configured to store fuel for the gas turbine engine;
   a fuel supply line configured to supply fuel from the fuel tank to a combustor of the gas turbine engine;
   a reheat fuel supply line configured to supply fuel from the fuel tank to a reheat of the gas turbine engine, the reheat fuel supply line extending from a reheat branching point on the fuel supply line to the reheat;
   a fuel supply pump along the fuel supply line upstream of the reheat branching point;
   a reheat pump along the reheat fuel supply line, the reheat pump being configured to pressurise fuel to a reheat delivery pressure for delivery to the reheat;
   a reheat recirculation line configured to recirculate fuel from the reheat fuel supply line to a location upstream of the fuel supply pump, the reheat recirculation line extending from a reheat recirculation branching point on the reheat fuel supply line downstream of the reheat pump; and
   a reheat recirculation control system configured to
     control recirculation of the fuel from the reheat fuel supply line via the reheat recirculation line;
     determine a reheat pump supply rate from the reheat pump;
     determine a reheat fuel demand rate required by the reheat;
     determine a required recirculation rate based upon the reheat pump supply rate and the reheat fuel demand rate; and
     recirculate fuel at the required recirculation rate via the reheat recirculation line to provide fuel to the reheat at the reheat fuel demand rate.

2. The fuel management system for a gas turbine engine according to claim 1, wherein the reheat recirculation line is configured to recirculate fuel to the fuel tank, or to the fuel supply line upstream of the fuel supply pump.

3. The fuel management system for a gas turbine engine according to claim 1, wherein the reheat recirculation control system is configured to meter fuel flow to the reheat by selectively recirculating fuel from the reheat fuel supply line via the reheat recirculation line.

4. The fuel management system for a gas turbine engine according to claim 1, the reheat recirculation control system further comprising
   a reheat control system configured to determine the reheat fuel demand based on a reheat signal.

5. The fuel management system for a gas turbine engine according to claim 1, wherein the reheat recirculation line comprises a non-return valve for preventing backflow along the reheat recirculation line, and/or comprises an orifice plate for maintaining a minimum predetermined pressure in the reheat recirculation line.

6. The fuel management system for a gas turbine engine according to claim 1, wherein the reheat recirculation line comprises a recirculation heat exchanger.

7. The fuel management system for a gas turbine engine according to claim 1, further comprising a heat exchanger along:
  the reheat fuel supply line; and/or
  the fuel supply line upstream of the reheat branching point.

8. The fuel management system for a gas turbine engine according to claim 1, further comprising:
  a combustor pump along the fuel supply line downstream of the reheat branching point and upstream of the combustor, configured to pressurise fuel to a combustor delivery pressure for the combustor or to provide a demanded combustor fuel delivery rate; and
  a combustor heat exchanger located on the fuel supply line downstream of the reheat branching point and upstream of the combustor configured to exchange heat into fuel in the fuel supply line between the reheat branching point and the combustor.

9. The fuel management system for a gas turbine engine according to claim 1, further comprising a reheat pump controller configured to control speed, pressure, and/or flow rate of the reheat pump.

10. The fuel management system for a gas turbine engine according to claim 9, wherein the reheat pump controller is configured to operate the reheat pump so as to substantially maximise an efficiency of the reheat pump.

11. The fuel management system for a gas turbine engine according to claim 1, further comprising a flow control valve in the reheat fuel supply line downstream of the reheat pump and upstream of the reheat recirculation branching point.

12. A gas turbine engine comprising a fuel management system as claimed in claim 1.

13. The fuel management system for a gas turbine engine according to claim 1, wherein the reheat recirculation line comprises a recirculation heat exchanger, the reheat recirculation line comprises a first recirculation branch line and a second recirculation branch line, and the first recirculation branch line comprises the recirculation heat exchanger.

14. A method of managing fuel in a gas turbine engine comprising:
  supplying fuel from a fuel tank to a combustor of the gas turbine engine via a fuel supply line comprising a first fuel supply pump;
  branching fuel from the fuel supply line into a reheat fuel supply line for supplying fuel to a reheat of the gas turbine engine at a reheat branching point, the reheat branching point being downstream of the first fuel supply pump;
  pressurising the fuel in the reheat fuel supply line to a reheat delivery pressure using a reheat pump along the reheat fuel supply;
  recirculating fuel from the reheat fuel supply line via a reheat recirculation line to a location upstream of the first fuel supply pump, the reheat recirculation line extending from a reheat recirculation branching point on the reheat fuel supply line downstream of the reheat pump;
  controlling recirculation of the fuel from the reheat fuel supply line via the reheat recirculation line;
  determining a reheat pump supply rate from the reheat pump;
  determining a reheat fuel demand rate required by the reheat;
  determining a required recirculation rate based upon the reheat pump supply rate and the reheat fuel demand rate; and
  recirculating fuel at the required recirculation rate via the reheat recirculation line to provide fuel to the reheat at the reheat fuel demand rate.

* * * * *